(12) United States Patent
Liu et al.

(10) Patent No.: US 6,418,006 B1
(45) Date of Patent: Jul. 9, 2002

(54) WIDE TUNING RANGE VARIABLE MEMS CAPACITOR

(75) Inventors: Chang Liu, Champaign; Jun Zou, Urbana, both of IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/742,518

(22) Filed: Dec. 20, 2000

(51) Int. Cl.[7] .............................. H01G 5/00; H03H 5/12
(52) U.S. Cl. ...................... 361/277; 361/278; 361/290; 361/233; 361/283.4; 334/10; 334/14
(58) Field of Search ................................. 361/277, 278, 361/280, 281, 290, 232.2, 288, 287, 291, 282.3, 283.4, 283.1, 233; 334/10, 14

(56) References Cited

U.S. PATENT DOCUMENTS

| | | | | |
|---|---|---|---|---|
| 4,561,038 A | * | 12/1985 | Hatton et al. ................ | 361/280 |
| 4,857,684 A | * | 8/1989 | Gratke ........................ | 200/600 |
| 5,075,600 A | * | 12/1991 | El-Hamamsy et al. ...... | 315/248 |
| 5,640,133 A | | 6/1997 | MacDonald et al. | |
| 5,644,349 A | * | 7/1997 | Martin ........................ | 347/46 |
| 5,696,662 A | | 12/1997 | Bauhahn | |
| 5,880,921 A | * | 3/1999 | Tham et al. ................ | 361/233 |
| 5,946,176 A | * | 8/1999 | Ghoshal ...................... | 361/56 |
| 5,959,516 A | * | 9/1999 | Chang et al. ................ | 334/14 |
| 6,177,800 B1 | * | 1/2001 | Kubby et al. ................ | 324/458 |
| 6,196,067 B1 | * | 3/2001 | Martin et al. ................ | 73/514 |
| 6,215,644 B1 | * | 4/2001 | Dhuler ........................ | 361/280 |

FOREIGN PATENT DOCUMENTS

| | | |
|---|---|---|
| EP | 0 194 953 | 9/1986 |
| EP | 0 637 042 | 1/1995 |
| WO | WO 01/61848 | 8/2001 |

OTHER PUBLICATIONS

Z. Feng, H. Zhang, W. Zhang, B. Su, K. Gupta, V. Bright, and Y. Lee, "Mems–Based Variable Capacitor for Millimeter–Wave Applications", presented at Solid–State and Actuator Workshop, Hilton Head Island, SC, Jun. 4–8, 2000, pp. 255–258.

D.J. Young and B.E. Boser, "A micromachined variable capacitor for monolithic low–noise VCOs", Tech. Digest of Solid–state sensors and actuator workshop, Hilton Head Island, SC, pp. 86–89, 1996.

A. Dec and K. Suyama, Micromachine electro–mechanically tunable capacitors and their applications to RF IC's, IEEE transactions on microwave theory and techniques, vol. 46, No. 12, pp. 2587–2596, 1998.

J. Yao, S. Park and J. DeNatale, "High tuning ratio MEMS based tunable capacitors for RF communications applications," Tech. Digest, solid–state sensors and actuators workshop, Hilton Head Island, SC, pp. 124–127, 1998.

Z. Feng, H. Zhang, B. Su, K. Harsh, K.C.Gupta, V. Bright, Y. C. Lee, "Design and Modeling of RF MEMS tunable capacitors using electro–thermal acutators", IEEE MTT–s Digest, pp. 1507–1510 (1998).

\* cited by examiner

*Primary Examiner*—Chau N. Nguyen
*Assistant Examiner*—Nguyen T Ha
(74) *Attorney, Agent, or Firm*—Greer, Burns & Crain, Ltd.

(57) ABSTRACT

A MEM capacitor having a capacitance plate nearer a movable plate than a separate bias plate. Voltage potential between the bias plate and movable plate determines the value of capacitance between the movable plate and the capacitance plate. In a preferred MEM capacitor, the movable plate is suspended over two fixed plates, a bias plate and a capacitance plate. The movable plate is disposed opposite both the bias plate and the capacitance plate. A distance between opposing surfaces of the capacitance plate and the movable plate is less than a distance between the bias plate and the capacitance plate. Preferably, the relative difference in distances between the plates is accomplished by a mechanically suspended movable plate that is shaped to have portions in at least two separate planes.

14 Claims, 2 Drawing Sheets

GOLD
GLASS SUBSTRATE

Ni-Fe

WIDE TUNING RANGE VARIABLE MEMS CAPACITOR

FIELD OF THE INVENTION

The field of the invention is micro electromechanical (MEM) capacitors.

BACKGROUND OF THE INVENTION

Various devices would benefit from capacitors with a wide tuning range. Wireless communication systems, for example, would benefit from tunable capacitors having a wide tuning range and low loss. A useful capacitor should also be capable of being monolithically integrated with other IC circuits.

Tunable capacitors are widely used in RF communication applications for low-noise paramteric amplifiers, harmonic frequency generators, and frequency controllers such as voltage-controlled oscillators. Typically, solid-state veractors used for these devices. However, solid-state veractors provide a very limited tuning range with high resistive loss.

MEM capacitors offer better range and other advantages. MEM capacitors can achieve higher quality factor compared to CMOS veractors. Integration of MEM capacitors provides lower interconnection and parasitic related losses. In addition, the MEM capacitors can reduce complexity due to monolithic integration. Conventionally, MEM capacitors have a mechanically suspended plate suspended over a fixed plate. A bias voltage is used to vary the distance between the two parallel plates, and accordingly vary the capacitance. However, the adjustable range of the conventional MEM tunable capacitor is limited by the pull-in effect. This effect limits how close the parallel plates may be brought together. The conventional devices are limited to a tunable range defined by one third of the distance between the parallel plates. Once spacing is reduced by one third, the pull in effect causes the plates to be brought together. An explanation of this limit is included in the description of a MEM capacitor developed by Young and Boser in "A Micromachined Variable Capacitor for Monolithic Low-Noise VCOS," Tech. Digest of Solid State Sensors and Actuator Workshop, Hilton Head, S.C., Jun. 2–6, 1996, pp. 124–127.

A MEM capacitor having a structure that permitted a wider tuning range would be beneficial. It is an object of the present invention to provide such a capacitor.

SUMMARY OF THE INVENTION

The present invention provides a capacitor structure having a capacitance plate nearer a movable plate than a separate bias plate. Voltage potential between the bias plate and movable plate determines the value of capacitance between the movable plate and the capacitance plate.

In a preferred embodiment MEMs capacitor, the movable plate is suspended over two fixed plates, a bias plate and a capacitance plate. The movable plate is disposed opposite both the bias plate and the capacitance plate. A distance between opposing surfaces of the capacitance plate and the movable plate is less than a distance between the bias plate and the capacitance plate. Preferably, the relative difference in distances between the plates is accomplished by a mechanically suspended movable plate that is shaped to have portions in at least two separate planes.

DETAILED DESCRIPTION OF THE PREFERRED EMBODIMENTS

Figure 1A:
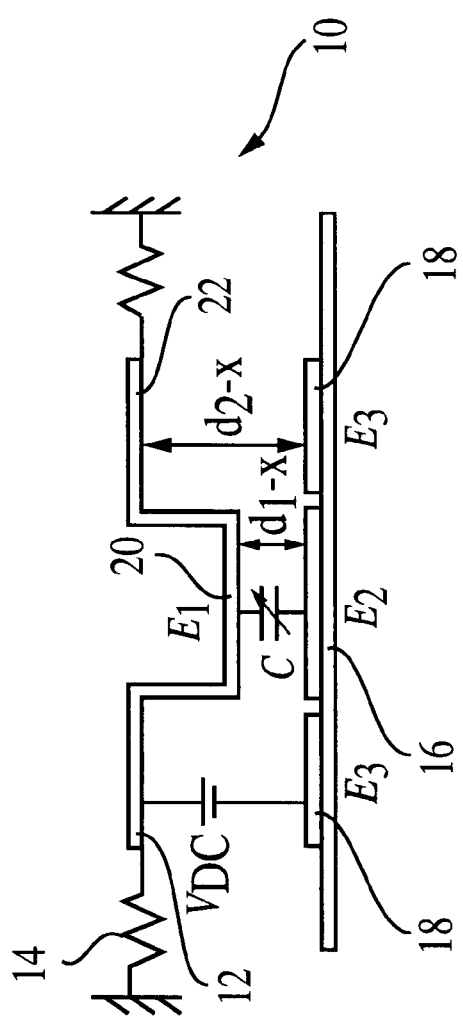
FIG. 1(a) is schematic model of a preferred variable MEM capacitor of the invention.
Figure 1C:
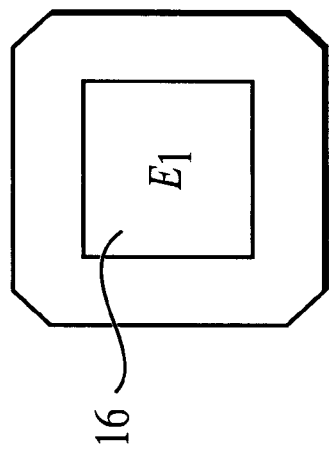
FIG. 1(c) is a schematic top view of a preferred movable plate usable with the set of fixed plates in FIG. 1(b) to realize a preferred variable MEM capacitor modeled in FIG. 1(a)
Figure 1B:
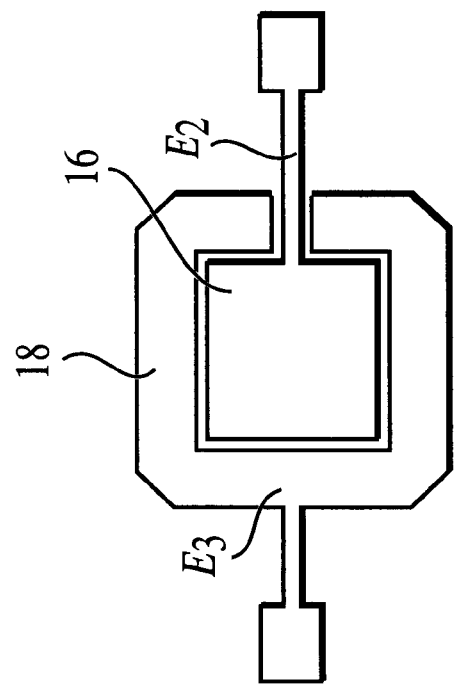
FIG. 1(b) is a schematic top view of a preferred set of fixed plates to realize a preferred variable MEM capacitor modeled in FIG. 1(a)

Referring now to FIGS. 1(a)–1(c), a preferred variable MEM capacitor 10 of the invention includes a movable plate 12 suspended by a mechanical suspension 14 over two fixed plates, a capacitance plate 16 and a bias plate 18. A portion 20 of the movable plate 12 that is opposite the capacitance plate is offset from remaining portions 22 of the movable plate 12. This makes the distance between the movable plate 12 and the capacitance plate 16 less than the distance between the movable plate 12 and the bias plate 18.

In the preferred embodiment of FIGS. 1(a)–1(c), the bias plate 18 substantially surrounds the capacitance plate 16. This is an effective layout for use with the preferred movable plate 12 having the central offset region 20. The layout maximizes the amount of opposing surface area between the movable plate 12 and both the capacitance plate 16 and the bias plate 18.

Capacitance of the variable capacitor 10 depends upon the distance between the offset portion 20 of the movable plate 12 and the capacitance plate 16. This distance is adjusted by varying a magnitude of a bias voltage $V_{DC}$ between the movable plate 12 and the bias plate 18. At rest, $V_{DC}$ is 0V and there is a distance $d_1$ between opposing surfaces of the movable plate 12 and the capacitance plate 16. Setting a nonzero value to $V_{DC}$ reduces the distance between these opposing surfaces by an amount (x).

Preferably, the distance $d_1$ is less than or equal to one third of a distance $d_2$ between opposing surfaces of the movable plate 12 and the bias plate. This gives the device a theoretical arbitrary tuning range if the fringing effect is neglected and it is assumed that the movable plate may be pulled in to an infinitely close distance to the capacitance plate 16. Simulations accounting for the fringing effect show a maximum tuning range of 90.8%. Where the distance $d_1$ exceeds one third of a distance $d_2$, the maximum tuning range of the device is $d_2/(3d_1-d_2)$. In practical devices, both tuning ranges will be reduced by other factors, such as surface roughness and curvature.

Prototype devices of the invention have been fabricated. In prototypes, the mechanical suspension 14 was realized by a set of four cantilever beam suspension arms connected to four separate sides of the movable plate. Simulations indicate the four-beam suspension to be ideal and also show that the design should permit achievement of a 100% tuning range. The arms were connected to contact pads. In prototype devices, $d_1$ was 2 µm and $d_2$ was 3 µm. The maximum measured tuning range for each (measured with an HP 4284A precision LCR meter at a frequency of 1 MHz) of four prototypes fabricated on a common substrate was, respectively, 50.9%, 55.6%, 59.2%, and 69.8%. The reduction is caused by parasitic capacitance that is contributed by lead wires. These are not included in the model.

Figure 2A:
FIGS. 2(a)–2(f) illustrate a fabrication process used to form prototypes.
Figure 2B:
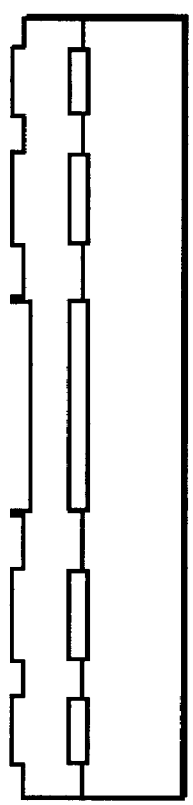
Figure 2C:
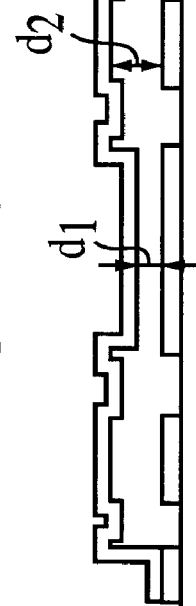
Figure 2D:
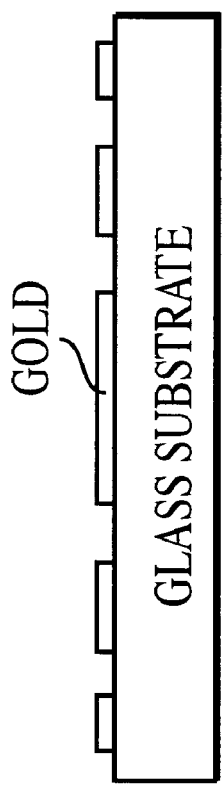
Figure 2E:
Figure 2F:

The prototypes were fabricated on a glass plate using surface micromachining techniques. The fabrication process for the prototypes is illustrated in FIGS. 2(a)–2(f). Film thickness is given for sake of complete description of the prototype formation process. Dimensions are essentially arbitrary to the limit of formation capabilities and mechanical integrity and performance, e.g., the ability of the cantilevers to deform in a desired manner without being damaged. FIG. 2(a) illustrates a gold film (5000 Å) thermally evaporated and patterned to form fixed capacitance and bias plates. Next, a copper film (1 μm) was thermally evaporated and patterned, as shown in FIGS. 2(b) and 2(c), followed by an additional 2 μm thick copper film evaporated to form a variable-height sacrificial layer in FIG. 2(d). The cantilever arms and movable plate for prototypes where then formed by a 2 μm Ni—Fe electroplate deposit using the copper layer as a seed layer, as seen in FIG. 2(e). The copper sacrificial layer is then etched away to release the suspension and movable plate, completed in FIG. 2(f).

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A variable micro electromechanical capacitor, comprising:

a bias plate;

a capacitance plate; and a movable plate held by a supporting suspension, the movable plate being disposed opposite both said bias plate and said capacitance plate and being movable relative to said capacitance plate; wherein a distance between opposing surfaces of said capacitance plate and said movable plate is less than a distance between said bias plate and said capacitance plate.

2. The capacitor according to claim 1, wherein the distance between opposing surfaces of said capacitance plate and said movable plate is less than or equal to one third of the distance between said bias plate and said capacitance plate.

3. The capacitor according to claim 2, wherein said movable plate comprises a plate having an offset area, the offset area being aligned with said capacitance plate to set the distance between a surface of said capacitance plate defined by said offset area and said movable plate less than or equal to one third of the distance between said bias plate and a surface of said capacitance plate opposite said bias plate.

4. The capacitor according to claim 3, wherein said movable plate is supported by a cantilever suspension suspended by a plurality of cantilever beams.

5. The capacitor according to claim 4, wherein said offset area is formed in a central portion of said movable plate, said capacitance plate is opposite said central portion, and said bias plate substantially surrounds said capacitance plate to be disposed opposite a substantial remaining portion of said movable plate.

6. The capacitor according to claim 4, wherein said cantilever beams are connected to contact pads.

7. The capacitor according 6, comprising four cantilever beams connected to four contact pads and said movable plate.

8. The capacitor according to claim 2, wherein the distance between opposing surfaces of said capacitance plate and said movable plate and the distance between said bias plate and said capacitance plate are on the order of ones to tens of micrometers.

9. The capacitor according to claim 2, wherein said bias plate, said capacitance plate and said movable plate comprise thin film metal plates.

10. The capacitor according to claim 2, wherein said bias plate and said capacitance plate are formed on the surface of a common substrate and said movable plate is movable suspended opposite said bias plate from a cantilever suspension to said common substrate.

11. The capacitor according to claim 10, wherein said cantilever suspension comprises a set of cantilever beams connected to contact pads.

12. The capacitor according 11, wherein said set of cantilever beams comprises four cantilever beams connected to four contact pads and four separate sides of said movable plate.

13. A micro electromechanical capacitor, comprising:

a substrate;

a thin film capacitance plate and associated electrical contact both formed on a surface of said substrate;

a thin film bias plate and associated electrical contact both formed on said surface of said substrate;

a set of contact pads on said substrate; and a thin film movable plate suspended over said thin film capacitance plate and said thin film bias plate from a set of cantilever arms terminating at said contact pads to form an air gap between said thin film capacitance plate and said thin film bias plate, wherein said thin film movable plate is shaped to be closer to said capacitance plate than said bias plate.

14. The capacitor according to claim 13, wherein a distance between opposing surfaces of said capacitance plate and said movable plate is less than or equal to one third of a distance between said bias plate and said capacitance plate.

* * * * *

UNITED STATES PATENT AND TRADEMARK OFFICE
CERTIFICATE OF CORRECTION

PATENT NO. : 6,418,006 B1
DATED : July 9, 2002
INVENTOR(S) : Chang Liu

It is certified that error appears in the above-identified patent and that said Letters Patent is hereby corrected as shown below:

<u>Column 1,</u>
Line 1, insert:
-- STATEMENT OF GOVERNMENT INTEREST

This invention was made with government support under Contract Number F30602-97-0328 awarded by the Defense Advanced Research Projects Agency (DARPA). The government has certain rights in the invention. --

Signed and Sealed this

Eighteenth Day of November, 2003

JAMES E. ROGAN
*Director of the United States Patent and Trademark Office*